United States Patent
Kato et al.

(10) Patent No.: US 6,370,917 B1
(45) Date of Patent: Apr. 16, 2002

(54) QUENCHING METHOD AND APPARATUS FOR TEMPERING A GLASS SHEET

(75) Inventors: Yasumasa Kato, Yokohama; Jun Nagata, Aichi; Shigeyuki Seto, Kanagawa; Satoshi Yoshida, Yokohama, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/642,648

(22) Filed: Aug. 22, 2000

Related U.S. Application Data

(62) Division of application No. 09/096,179, filed on Jun. 12, 1998, now Pat. No. 6,180,237.

(30) Foreign Application Priority Data

Jun. 13, 1997 (JP) ............................................. 9-157061
Oct. 31, 1997 (JP) ............................................. 9-301049

(51) Int. Cl.⁷ ............................................ C03B 27/044
(52) U.S. Cl. .............................. 65/114; 65/104; 65/194; 65/348
(58) Field of Search ......................... 65/104, 114, 194, 65/348; 239/590.5, 601

(56) References Cited

U.S. PATENT DOCUMENTS

| | | | |
|---|---|---|---|
| 2,271,377 A | | 1/1942 | Monnet ........................ 65/114 |
| 3,125,430 A | | 3/1964 | Richardson ................... 65/114 |
| 3,793,127 A | | 2/1974 | Wartenberg .................... 161/1 |
| 3,881,907 A | * | 5/1975 | Starr ............................. 65/114 |
| 3,923,488 A | * | 12/1975 | Pytel et al. .................... 65/114 |
| 4,128,690 A | | 12/1978 | Boardman et al. ........... 428/332 |
| 4,178,414 A | | 12/1979 | Greenhalgh .................. 428/410 |
| 4,198,463 A | | 4/1980 | Greenhalgh .................. 428/332 |
| 4,515,622 A | | 5/1985 | McMaster et al. ............. 65/351 |
| 4,652,434 A | * | 3/1987 | Bonsack et al. ............. 423/155 |
| 4,662,926 A | * | 5/1987 | Aratani et al. ................. 65/114 |
| 4,711,655 A | * | 12/1987 | Schultz ......................... 65/351 |
| 5,127,932 A | | 7/1992 | Aratani ......................... 65/114 |
| 5,976,203 A | * | 11/1999 | Deeke et al. ................ 48/62 R |
| 6,098,896 A | * | 8/2000 | Haruch ........................... 239/8 |

FOREIGN PATENT DOCUMENTS

| | | |
|---|---|---|
| EP | 0 558 912 A1 | 9/1993 |
| WO | WO 91/11398 | 8/1991 |

* cited by examiner

Primary Examiner—Sean Vincent
(74) Attorney, Agent, or Firm—Oblon, Spivak, McClelland, Maier & Neustadt, P.C.

(57) ABSTRACT

A quenching method and apparatus for tempering a glass sheet. The method includes a step of transferring a heated glass sheet between quenching boxes which are provided with nozzles opposingly arranged near upper and lower surfaces of the glass sheet to blow air streams of cooling air supplied from the quenching boxes to the glass sheet. The method also includes the step of arranging the nozzles extending from the quenching boxes so as to face at least one of the upper and lower surfaces of the glass sheet so that openings on the end of the nozzles blow the air streams of the cooling air in different directions simultaneously so as to intersect and thus be substantially uniformly arranged with respect to the glass sheet. The number of intersections is approximately 30 or more in any 10 cm square area of the glass sheet. The end portions of the nozzles have a semi-spherical shape. The apparatus includes quenching boxes arranged opposing the surfaces of the glass sheet, and nozzles extend from the quenching boxes so that air streams of cooling air are blown towards the glass sheet which has been heated to a predetermined temperature. Each of the nozzles has a tubular form with a semi-spherically shaped end portion opposing the surfaces of the glass sheet. The end portions of the nozzles each have a plurality of openings so that air streams of cooling air supplied from the quenching boxes are blown towards the surfaces of the glass sheet. The openings formed are uniformly arranged in the end portion of the nozzles.

5 Claims, 5 Drawing Sheets

QUENCHING METHOD AND APPARATUS FOR TEMPERING A GLASS SHEET

This application is a Division of application Ser. No. 09/096,179 Filed on Jun. 12,1998 now U.S. Pat. No. 6,180, 237.

BACKGROUND OF THE INVENTION

The present invention generally relates to a tempered glass and a method and an apparatus for quenching a glass sheet to obtain the tempered glass sheet and more particularly, the present invention relates to a thin tempered glass having a large surface area and a complicated curved surface, such as a back light glass for automobiles, and a quenching method and a quenching apparatus for tempering the glass sheet of reduced thickness.

DISCUSSION OF BACKGROUND

A tempered glass is used for a window glass for automobiles except for a front windshield glass. There are official regulations on fragmentation of tempered glass from the standpoint of safety so that the driver or a passenger is prevented from injuring. A window glass for automobiles is not permissible to use unless the window glass satisfies requirements described in the official regulations.

For example, in one of the regulations on the tempered glass for automobile windows, there is a regulation concerning a state of fragmentation of glass produced when a localized impact is given to the tempered glass. Specifically, an area in which a number of the fragments of a glass sheet broken by an impact is minimum and an area in which a number of the fragments is maximum are selected, and the minimum and maximum numbers of the fragments in these areas have to fall in permissible ranges. The maximum size of glass particles produced from a fractured glass sheet is determined from a minimum permissible number of the fragments. When the maximum size is small, a danger of suffering injury from larger fragments is reduced. Further, the minimum size of the fragments produced by the fracture of the glass sheet is determined by a maximum permissible number of the fragments. When the minimum size is large, a danger of entering of glass particles into a human body is reduced. ECE standards or JIS standards rule the magnitude and so on of fragmentation of glass sheet when fractured. In ECE standards (E6), for example, it is required that a number of fragments in any 5 cm×5 cm square should be 40 at the minimum and 400 at the maximum (except for a belt-like region of 20 mm from the edge of the glass sheet and a circular region of 75 mm radius having the center which is the point of initiating breakage). In the following description, the maximum value of a number of fragments of glass is referred to as the maximum number and the minimum value is referred to as the minimum number. Further, there are requirements that when a glass sheet is broken, edges of fragments should not be sharp and elongated fragments having a length of 75 mm or more should not be produced. Further, there is a requirement that the surface area of a fragment should not exceed 3 cm$^2$.

A tempered glass can be formed by heating a glass sheet to a temperature near the softening point of the glass (usually about 600–700° C.) and quenching it by supplying cooling air. The cooling air is blown to the glass sheet through a plurality of cooling nozzles disposed near both surfaces of the glass sheet. Thus, a temperature difference is given to the glass sheet between a surface portion and the inner portion of the glass sheet at the time of quenching so as to from a compressive stress layer in the glass surface finally solidified, whereby the glass sheet is tempered.

Recently, weight reduction is required for automobiles to reduce fuel cost and so on. With this, there is an increased demand of reducing the weight by reducing the thickness of glass sheets. Using a glass sheet of about 4–6 mm thick, a tempered glass satisfying the above-mentioned requirements can easily be obtained by the above-mentioned glass tempering method (quenching method). However, when a thin glass sheet is to be formed to meet the requirement of weight reduction, it was difficult to obtain a tempered glass satisfying the regulations by the above-mentioned tempering method because a sufficient temperature difference could not be form between the surface and the inner portion of the glass sheet due to the glass sheet being thin.

In concepts, there are considered various measures to increase a pressure of cooling air; to bring the nozzles closer to the glass sheet; to reduce the distance (pitch) between nozzles and so on in order to provide a sufficient temperature difference between the surface and the inner portion of the glass sheet. An attempt of increasing a pressure of cooling air is not realistic because there is a limit in terms of mechanism in a blowing device or a compressor.

It is necessary that the cooling air is supplied to the glass sheet to assure a way of escape of the cooling air after it impinges on the glass sheet. If the cooling air, after impingement, stays there, the cooling air prohibits successively supplied cooling air from impinging on the glass sheet whereby it is difficult to obtain uniform blowing of cooling air to the glass sheet. When the nozzle pitch is reduced or the nozzles are brought closer to the glass sheet, the way of escape of cooling air, after the impingement on the glass sheet, can not be assured.

Further, there has been proposed a method of oscillating the glass sheet at the time of blowing cooling air for tempering the glass sheet, whereby the glass surface is uniformly quenched. In this method, when the nozzles are brought closer to the glass sheet, the oscillated glass sheet may interfere with the nozzles. In particular, when the glass sheet is shaped to have a complicated curved surface, there is a large possibility of interfering of the nozzles with the glass sheet.

There has been proposed to conduct a tempering treatment with a special arrangement of nozzles so that a tempered glass of thin thickness can be obtained. The proposal is to control the propagation of fracture of glass by forming areas of different principal stress in the glass sheet.

Here, description is made as to a direction of the principal stress and a principal stress difference in a glass sheet. First, a plane which is perpendicular to the glass sheet surface (a cross-sectional plane of the glass plate) is selected from the glass sheet and then, a point is selected from the selected plane. Various angles with a line in parallel to the glass surface are selectable from the selected plane. Stresses in a direction perpendicular to the selected plane acting on this point are unequal depending on angles of the selected plane. So, there is one selected plane which has the largest stress and the smallest stress, which are perpendicular to each other, when a certain angle is selected from among the various angles. The principal stress direction is defined as the direction of the largest stress and the smallest stress. Hereafter, the direction of the largest stress is referred to as the principal stress direction, as representative. Further, the largest stress and the smallest stress (i.e., the stress in the direction perpendicular to the direction which indicates the largest stress) is a principal stress difference. In a tempered glass, the principal stress is estimated from the principal stress difference which is obtained with a photoelasticity method. The principal stress difference of the tempered glass corresponds to a value obtained by dividing the sum of values of the difference between the largest stress value and the smallest stress value at points aligned in the glass sheet thickness direction by the thickness of the glass sheet (an average value obtained by dividing an integrated value of the difference between the largest stress value and the smallest stress value by the thickness). Namely, when a certain point is selected in a surface of the glass sheet, an averaged integrated value of the difference between the largest stress value and the smallest stress value at points aligned in the direction of the thickness from the selected point, is referred to as the principal stress difference at the selected point (the principal stress direction in this case is referred to as the principal stress direction at this point).

For the tempered glass in which there are areas having different principal stress direction, the following proposal is made. U.S. Pat. No. 4,128,690 describes a tempered glass having a thickness of 2.5–3.5 mm. The tempered glass has a central tensile stress of 62 MN/m$^2$ at the maximum (a surface compressive stress of 124 MN/m$^2$ at the maximum). The tempered glass has a distribution of areas in which the principal stresses acting in the plane of the glass sheet are unequal. Further, there is described in the US patent that in the areas having different principal stresses in the tempered glass, the maximum value of principal stress difference is in a range of 8–25 MN/m$^2$ and the distance between the adjacent areas indicating the maximum value is in a range of 15–30 mm.

However, when the glass sheet having a thickness of 3.0 mm or less is actually produced as a tempered glass having the above-mentioned distribution, the following disadvantage is found. In the fragmentation test according to E6, the difference between a maximum number and a minimum number becomes large. This shows that either an upper limit of the maximum number or a lower limit of the minimum number ruled in E6 is apt to be outside even by a slight change of conditions for forming the tempered glass (e.g., an outside air temperature and so on). The tempered glass having such distribution tends to produce elongated fragments of glass. Further, the maximum surface area of the fragments is generally apt to exceed 3 cm$^2$. It is supposed that such tendencies are derived from a coarse distribution of the areas.

Japanese Unexamined Patent Publication JP-A-55–104935 describes a tempered glass of 2.5–3.5 mm thick. The tempered glass has an average surface compressive stress of 850–1350 kg/cm$^2$ and areas in which the principal stresses acting in the plane of the glass sheet are unequal are formed in a scattered state. In such areas, the maximum value of the principal stress difference is in a range of 50–300 kg/cm$^2$, and the distance between adjacent areas indicating the maximum value is in a range of from 5 mm or more to less than 15 mm.

In the above-mentioned publication, there is a statement concerning a tempered glass of 2.5 mm thick in Example 5. The distance between adjacent areas indicating the maximum value of principal stress difference is 7.1–9.0 mm. Namely, it is understood that use of a thin glass sheet can obtain a tempered glass capable of meeting the official requirements if the above-mentioned distance is reduced. The reduced distance causes an irregular pattern of cracks in the tempered glass when the fragmentation test is carried out. The irregular pattern of cracks is advantageous in obtaining smaller fragments of glass.

However, in forming the irregular pattern of cracks, the development of cracks depends on nothing, namely, it is difficult to artificially control the production of cracks. On the other hand, a slight change in the conditions for forming the tempered glass will result a delicate change of a magnitude of the stresses or a distribution of the stresses in the tempered glass to be produced. In particular, a thin glass sheet is easily influenced by a slight change of the conditions. Accordingly, if the development of cracks can not be well controlled, it is difficult to estimate a magnitude of the stresses or a distribution of the stresses whereby determination of the forming conditions is difficult.

Japanese Unexamined Patent Publication JP-A-58-91042 describes a tempered glass having a thickness of 2.4–3.5 mm in which belt-like regions having a higher surface compressive stress of 1300 kg/cm$^2$ or less at the maximum and belt-like regions having a lower surface compressive stress of 1020 kg/cm$^2$ or more at the minimum value are alternately formed in its surface. The difference between the maximum value and the minimum value of the surface compressive stress is 80–220 kg/cm$^2$. In the belt-like regions having a lower surface compressive stress, the maximum value of the principal stress difference is 80 kg/cm$^2$ or more.

Of several kinds of tempered glass described in the publication, attention is paid to a glass sheet of 2.4 mm thick. For such glass sheet, it is required either to reduce the width of the belt-like regions having a lower surface compressive stress or to increase the principal stress value of the belt-like regions having a lower surface compressive stress. When the width of the belt-like regions having a lower surface compressive stress is reduced, the irregular pattern of cracks can easily be produced. When the principal stress value of the belt-like regions having a lower compressive stress is increased, a practically required strength of the tempered glass may not be obtained because the principal stress difference is originally a tensile stress.

With respect to the practically required strength, the following disadvantage is, in particular, thought. Namely, the belt-like regions having a lower surface compressive stress correspond to portions to which cooling air streams are not applied during the tempered treatment. Accordingly, for the glass sheet having a thickness of 2.4 mm, it is practically difficult to render the surface compressive stress of glass sheet portions to which cooling air streams is not applied, to be 1020 kg/cm$^2$ or more. Accordingly, it is estimated that the surface compressive stress in these portions is actually about 900 kg/cm$^2$ at the most. The obtained value is insufficient in terms of a practically required strength in the tempered glass to be produced.

In an example of the above-mentioned publication, there is described an average surface compressive stress concerning a glass sheet having a thickness of 2.4 mm, i.g., there is described an example of a tempered glass having an average surface compressive stress of 1100 kg/cm$^2$ and a difference 190 kg/cm$^2$ between the higher and lower surface compressive stresses. The values disclosed therein is an average value between a higher compressive stress and a lower compressive stress. Accordingly, the publication does not describe a tempered glass in which the surface compressive stress in the belt-like regions is, in fact, 1020 kg/cm$^2$.

As described above, the tempered glass having a thickness of about 2.5 mm in which a distribution of principal stress is formed in the glass sheet is known. However, it was in fact difficult for the tempered glass to satisfy the official requirements when a glass sheet having a thickness of about 2.5 mm was used. Further, there were many problems for equipment in order to obtain the thin tempered glass meeting the official requirements. In particular, there were problems of equipment for a glass sheet having a complicated curved shape or a glass sheet having a large surface area. In concept, the official requirements will be satisfied by making a distribution of areas in which the principal stresses are different to be dense. For the satisfaction, it is necessary to use measurements such as bringing the nozzles for supplying cooling air closer to the glass sheet, reducing the distance (pitch) between adjacent nozzles and so on. Such measures result the before-mentioned disadvantage that the way of escape of cooling air after the impinge with the glass sheet can not be assured.

SUMMARY OF THE INVENTION

It is an object of the present invention to provide an improved tempered glass of thin thickness, a method for cooling a glass sheet and an apparatus for cooling the glass sheet by which the tempered glass can easily be obtained.

In accordance with the present invention, there is provided a tempered glass comprising a glass sheet having a thickness of 2.3–3.5 mm in which an average surface compressive stress of 1000–1300 kg/cm$^2$ is formed, the tempered glass being characterized in that:

there are formed a plurality of mutually parallel belt-like regions A having a width of 10–30 mm and a plurality of belt-like regions B each being interposed between adjacent belt-like regions A in the glass sheet;

in the belt-like regions A, there are a plurality of reference points a having a principal stress difference of 120 kg/cm$^2$ or less, which is larger than principal stresses at peripheral areas of the reference points a, wherein directions of principal stresses are mutually in substantially parallel; there exists no point having a larger principal stress difference than principal stress differences between adjacent reference points a; and the shortest lines connecting adjacent reference points a form the center line, as the reference line, of each of the belt-like regions A; and in the belt-like regions B, there are a plurality of reference points b which have a larger principal stress difference than principal stress differences at any peripheral areas of the reference points b, and the directions of principal stress at the reference points b are different from the directions of principal stress at areas adjacent to the reference points b.

There is provided a tempered glass comprising a glass sheet having a thickness of 2.3–3.5 mm in which an average surface compressive stress of 1000–1300 kg/cm$^2$ is formed, the tempered glass being characterized in that:

there are formed a plurality of mutually parallel belt-like regions A having a width of 10–30 mm and a plurality of belt-like regions B each being interposed between adjacent belt-like regions A in the glass sheet;

in the belt-like regions A, there are a plurality of reference points a having a principal stress difference of 120 kg/cm$^2$ or less, which is larger than principal stresses at peripheral areas of the reference points a, wherein directions of principal stresses at the reference points a are mutually in substantially parallel; there exists no point, between adjacent reference points a, which has a larger principal stress difference than principal stress differences at any peripheral areas and which has a different stress direction from the principal stress directions at the reference points a, and the shortest lines connecting adjacent reference points a form the center line, as the reference line, of each of the belt-like regions A; and in the belt-like regions B, there are a plurality of reference points b which have a larger principal stress difference than principal stress differences at any peripheral areas of the reference points b, and the directions of principal stress at the reference points b are different from the directions of principal stress at areas adjacent to the reference points b.

In accordance with the present invention, there is provided a quenching method for tempering a glass sheet comprising transferring a heated glass sheet between a pair of quenching boxes each provided with a plurality of nozzles which are opposingly arranged near both surfaces of the glass sheet and which blow to the glass surfaces cooling air supplied from the quenching boxes, the quenching method being characterized in that nozzles arranged facing at least a side of the glass surfaces are provided with a plurality of openings capable of blowing the cooling air in different directions simultaneously wherein the cooling air is blown to the glass surface so that intersections of blowing directions of air streams of cooling air through the nozzles to the glass surface are arranged substantially uniform on the glass surface.

In accordance with the present invention, there is provided a quenching method for tempering a glass sheet comprising transferring a heated glass sheet between a pair of quenching boxes each provided with a plurality of nozzles which are opposingly arranged near both surfaces of the glass sheet and which blow to the glass surfaces cooling air supplied from the quenching boxes, the quenching method being characterized in that a plurality of nozzles in a tubular form are arranged at at least a side of the glass surfaces wherein each end portion of the nozzles opposing the glass sheet has a convex, curved shape, and a plurality of openings are formed in the end portion so that cooling air supplied from the quenching boxes is blown to the glass sheet through the nozzles.

Further in accordance with the present invention, there is provided a quenching apparatus for a glass sheet comprising at least quenching boxes arranged opposing to both surfaces of the glass sheet and a plurality of nozzles attached to the quenching boxes so that cooling air is blown through the nozzles to the glass sheet heated to a predetermined temperature, the quenching apparatus being characterized in that each of the nozzles is in a tubular form and has an end portion in a convex, curved shape at a side opposing the glass sheet, and a plurality of openings are formed in the end portion so that cooling air supplied from the quenching boxes is blown to the glass sheet.

BRIEF DESCRIPTION OF THE DRAWING FIGURES

DETAILED DESCRIPTION OF THE PREFERRED EMBODIMENTS

Preferred embodiments of the present invention will be described in detail with reference to the drawings.

Figure 1:
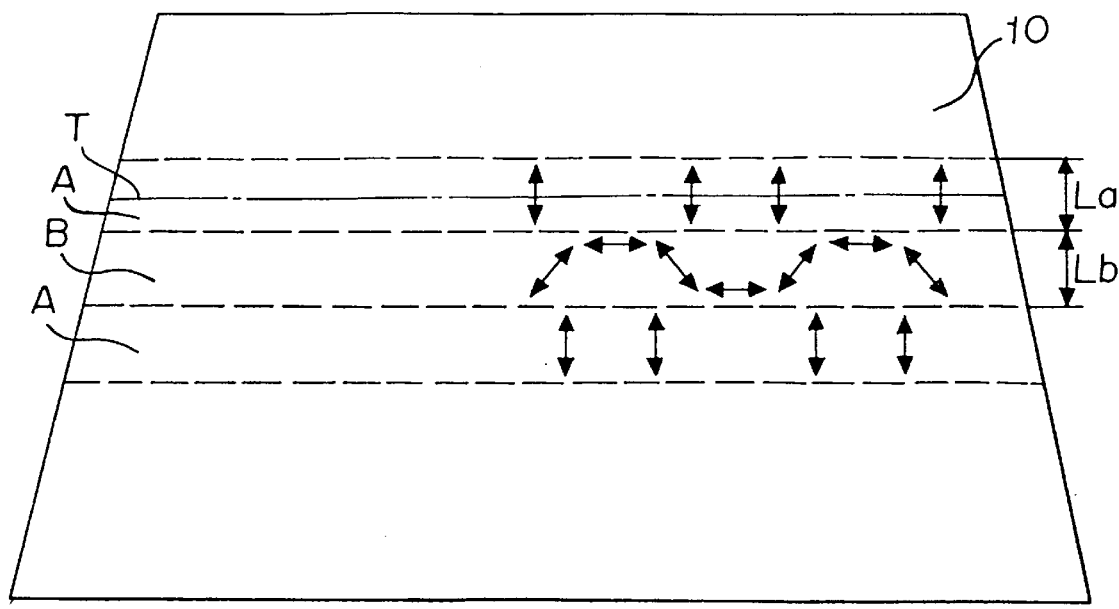
FIG. 1 is a diagram showing an embodiment of the tempered glass according to the present invention.
Figure 2:
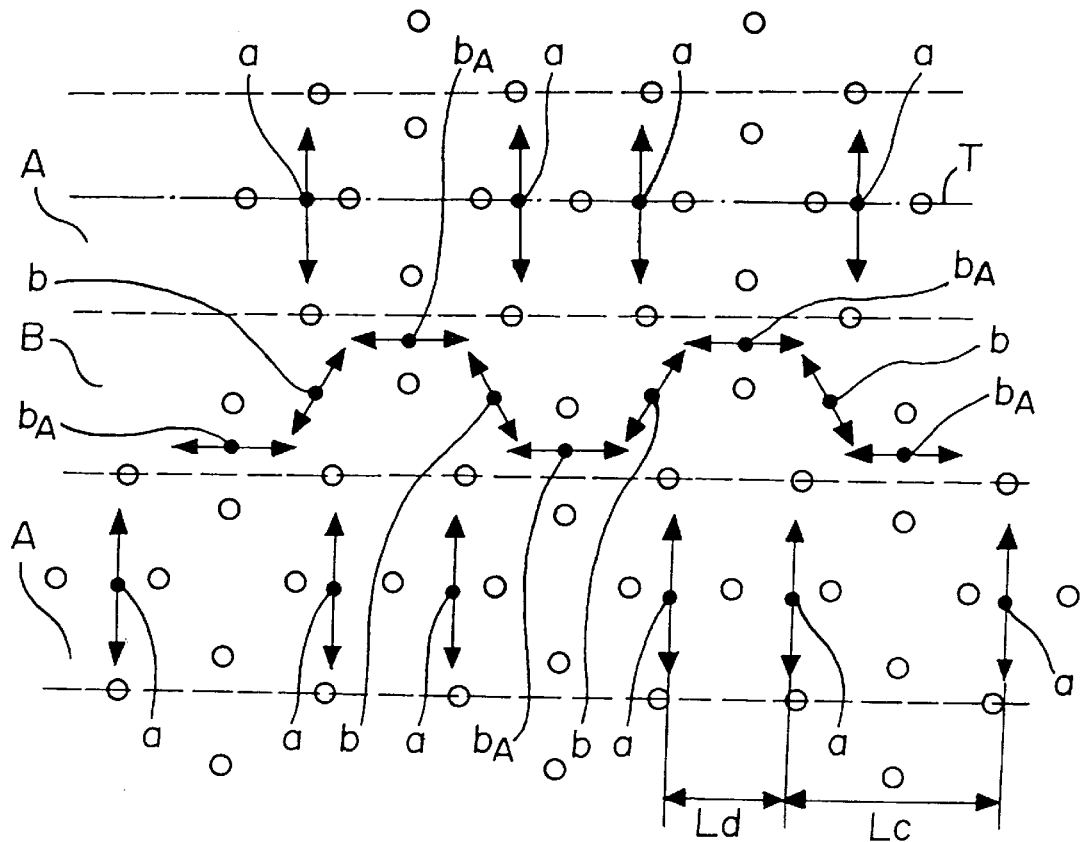
FIG. 2 is a diagram showing in an enlarged scale a portion of FIG. 1.

FIG. 1 is a diagram showing an embodiment of the tempered glass according to the present invention and FIG. 2 is a diagram showing in an enlarged scale the tempered glass, which are for explaining principal stresses formed in the tempered glass. Arrow marks in the Figures show the principal stress direction at each reference point. Larger circles indicate points to which cooling air streams impinge the glass sheet and smaller black points indicate reference points.

The thickness of a tempered glass 10 to be treated is in a range of 2.3–3.5 mm. In a special case wherein conditions such as outside air temperature and so on for quenching the glass sheet are not met, the performance of the cooling air, which described below, is sometimes insufficient. Accordingly, the thickness of the glass sheet which is more realistic and is preferable to obtain efficiently the tempered glass of the present invention is 2.5–3.1 mm. The compressive stress in average which is formed in the surface of the tempered glass is in a range of 1000–1300 kg/cm$^2$. Belt-like regions A and belt-like region B are alternately formed in the surface of the tempered glass 10.

Each of the belt-like regions A is a belt-like region having a width La in a range of 10–30 mm in which the reference line T as the center line is formed by a group of reference points a. The reference points a are points having a principal stress difference of 120 kg/cm$^2$ or less, which is larger than principal stress differences at any point around the reference points a. In addition, the reference points a are points selected so as to satisfy the following conditions: (a) there is no point having a larger principal stress difference than that at any other point between adjacent reference points a, or (b) there is no point having a principal stress direction which is different from the principal stress direction of the reference points a and having a larger principal stress difference than the principal stress difference at any point in the vicinity of the reference points a. The principal stress directions at the reference points a are mutually in substantially parallel and are substantially perpendicular to the longitudinal direction of the belt-like regions A. The sum (Lc+Ld) of the distance Lc between a pair of adjacent reference points a, a and the distance Ld between the another pair of adjacent reference points a, a is in a range of 40–60 mm.

In each of the belt-like regions B, there are dispersively a plurality of reference points k each having a larger principal stress difference than a principal stress difference at a point in the vicinity of the reference points b. A principal stress direction at a reference point b is different from a principal stress direction at another reference point b which is adjacent thereto.

In the tempered glass 10 shown in FIGS. 1 and 2, a line formed by tracing the principal stress directions of reference points b in a belt-like region B forms a snaking line. A principal stress direction at reference points b in the vicinity of the border line of an adjacent belt-like regions A (hereinbelow, referred to as reference points $b_A$) is substantially perpendicular to the principal stress direction of the reference points a.

In the tempered glass 10 of this embodiment, the reference points b are classified into first and second groups. Namely, the reference points b are arranged as follows The reference points b belonging to the first group have their principal stress directions which are substantially perpendicular to the principal stress directions of the reference points a. Further, they are alternately located in the vicinity of the border of either an adjacent belt-like region A or the other adjacent belt-like region A opposing thereto with respect to the reference line T. On the other hand, the reference points b belonging to the second group have their principal directions which substantially coincide with directions formed by connecting reference points b in the vicinity of the border of an adjacent belt-like region A in the first group and reference points b in the vicinity of the border of the other adjacent belt-like region A opposing thereto, the reference points b of the second group being interposed between adjacent reference points b of the first group.

Description has been made so that the principal stress directions at the reference points a are substantially parallel. Further, description has been made so that the principal stress directions at the reference points $b_A$ are substantially perpendicular to the principal stress directions at the reference points a. However, it should be understood that the terms "substantially parallel" or "substantially perpendicular" means that it is not always necessary to be strictly "Parallel" or "perpendicular" in the present invention. Namely, the above-mentioned principal stress directions should be "parallel" or "perpendicular" to an extend that the thin glass sheet has a distribution of stress capable of satisfying the official regulations. More detailed description will be made of this. The tempered glass of the present invention is formed by blowing cooling air for quenching to a heated glass sheet. In this case, a distribution of stress in the glass sheet surface can be obtained by desirably scattering points of impingement of cooling air streams on the glass sheet surface. On the other hand, the formation of the principal stress difference relys on a degree of quenching. However, it is difficult to keep the degree of quenching to be constant due to variations of outer air temperature and so on. Therefore, even though conditions for blowing the cooling air are determined so that the principal stress directions are oriented to predetermined directions (parallel or perpendicular directions), predetermined stress directions are not always oriented correct directions (parallel or perpendicular directions). In consideration of the above-mentioned circumstances, the tempered glass of the present invention includes such tempered glass that can satisfy the official regulations even though the principal stress directions are slightly different from desired directions (parallel or perpendicular directions). However, it is preferable for the principal stress directions to orient strictly predetermined directions (parallel or perpendicular directions) from the viewpoint of controlling accurately the development of cracks.

The reason why the tempered glass having such distribution of principal stresses can satisfactorily meet the official requirements even though the thin glass sheet, is as follows. First, the tempered glass of the present invention has the following characteristics:

(1) $120 \leq \sigma_a$ preferably, $40 \leq \sigma_a \leq 80$ (unit:kg/cm$^2$, $\sigma_a$: the principal stress difference of the reference points a, and (2) $10 \leq L_a \leq 30$ (unit: mm)

Further, it is preferable to provide the following characteristics:

(3) $10 \leq L_b \leq 30$ (unit: mm)

(4) $50 \leq \sigma_b$ (unit: kg/cm², $\sigma_b$: the principal stress difference of the reference points b)

(5) a line formed by tracing the principal stress directions at the reference points b is snaked, and the principal directions at the reference points $b_A$ are substantially perpendicular to the principal stress directions at the reference points a, and (6) $40 \leq L_c + L_d \leq 60$, $20 \leq L_c$, $L_d \leq 30$, preferably, $L_c > L_d$. The group of reference points b in the vicinity of the reference points $b_A$ correspond to $L_c$ and the adjacent thereto corresponds to $L_d$.

The number and the magnitude of fragments of the glass sheet in the fragmentation test depends on the behavior of the development of cracks. Namely, when cracks develop linearly, fragments tend to be elongated pieces and to be larger. Accordingly, it is required not to develop the cracks linearly.

Basically, the linearly developing of cracks can be prevented by the presence of the principal stresses because cracks tend to bend in the direction perpendicular to the principal stress directions. When a crack turns and joins another crack, a fragment is formed. In the tempered glass of the present invention, since reference points b having different principal stress directions are scattered in the belt-like regions B, cracks run from the belt-like regions A to the belt-like regions B. However, when a value of $\sigma_a$ is excessively large, cracks developing in the belt-like regions A can not be directed to the belt-like regions B even though the reference points b exist in the belt-like regions B.

Accordingly, when the above-mentioned condition (1) is satisfied, cracks developing in parallel to the longitudinal direction in the belt-like regions A are prevented from being continuously developing in the longitudinal direction (the principal stress directions at the reference points a are to lead the cracks in the direction in agreement with the developing direction of the cracks). When $40 > \sigma_a$, it is difficult to control the development of cracks. On the other hand, when $80 < \sigma_a$, there may occur a delicate restriction of the principal stress difference or the principal stress direction of the reference points b. Accordingly, $40 \leq \sigma_a \leq 80$ is in particular preferable.

There is a case of difficulty in preventing the development of cracks even though the condition (1) is satisfied. It is the case that $L_a$ is excessively large. Namely, the role of bending the direction of developing cracks running in the belt-like regions A is born by the principal stresses at the reference points b. Then, there is provided $L_a \leq 30$ so that cracks are influenced by the principal stresses at the reference points b. On the other hand, when $L_a$ is too small, it is difficult to bend the cracks running from the belt-like regions B to the belt-like regions A. Accordingly, both conditions (1) and (2) should be satisfied.

The reason why the satisfaction of the condition (3) is preferred is substantially the same as the reason that the condition (2) should be satisfied. On the other hand, in the tempered glass which satisfies the condition (5), cracks running in the belt-like regions B are bent in the direction perpendicular to the principal stress directions at the reference points b. Accordingly, cracks of snaking form can be formed and a desired development of cracks is obtainable even when there is slightly outside the range of (3).

On the other hand, in order to lead the development of cracks in a desired direction, the tempered glass should satisfy the condition (4). When $\sigma_b < 50$, it is difficult to control the development of cracks.

When the principal stress directions at the reference points $b_A$ are substantially perpendicular to the principal stress directions at the reference points a, cracks running in the belt-like regions A can easily be bent toward the belt-like regions B whereby the development of the cracks in the longitudinal direction of the belt-like regions A can be prevented. The reason why $L_c > L_d$ is in particular preferable in the satisfaction of the condition (6) is as follows. When a distance between adjacent reference points a is larger, larger fragments are apt to be produced at this area. Accordingly, it is required to bend cracks developed in the belt-like regions A toward the belt-like regions B to thereby control the production of larger fragments. Therefore, it is desirable to provide reference points $b_A$ in the vicinity of adjacent reference points a, the distance of which is relatively large. Accordingly, in the determination of $L_c > L_d$, cracks developing in the belt-like regions A can be bent toward the belt-like regions B whereby the production of larger fragments in the belt-like regions A can be prevented.

As described above, several factors mutually influence in controlling the cracks. In particular, in use of a thin glass sheet, it is difficult to form a temperature difference between the surface and the inner portion of the glass sheet. Accordingly, the fragmentation meeting the official requirements can not be obtained by the conventional method for controlling the development of cracks. According to the present invention, the tempered glass which satisfies the conditions (1) and (2) is proposed. In addition, it is preferable for the tempered glass to have the principal stress characteristics of the conditions (3) to (6).

In the following, description will be made as to a method of measuring the stress values.

(A) Measurement of a Surface Compressive Stress

JIS R3222 is applicable to the measurement of surface compressive stresses. JIS R3222 concerns heat strengthened glass. In the measurement, the tempered glass of the present invention is measured as samples. The above-mentioned Japanese standards describes points to be measured. However, in the measurement of compressive stresses in the tempered glass of the present invention, a plurality of optionally selected points are measured irrespective of the standard. Then, an average value of surface compressive stress is obtained from the measured values at the plurality of points.

For the measurement of the points, it is preferable to select points in a circular area of 75 mm radius around the central point of the glass sheet. In particular, it is preferable to select respectively the same number of points in which the surface compressive stress value is expected to have the maximum value and the surface compressive stress value is expected to have the minimum value. Further, the surface compressive stress value should be the maximum at a point where the blowing direction of a cooling air stream for cooling the glass sheet intersects, the surface of the glass sheet, and the surface compressive stress value should be the minimum at the middle point between adjacent two points of intersection.

Figure 7:
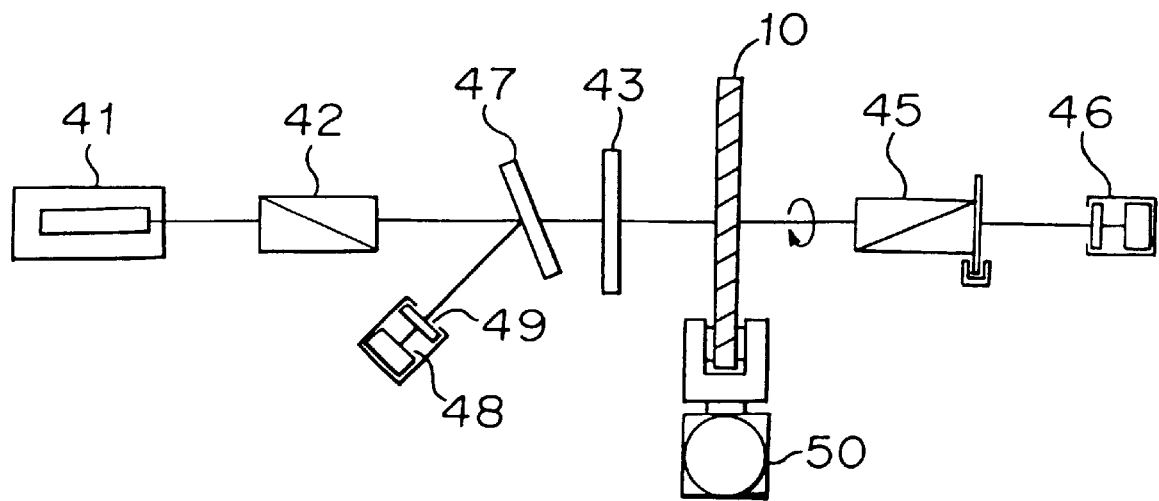
FIG. 7 is a diagram showing a measuring device used for obtaining a principal stress direction and a principal stress difference.

(B) The Measurement of a Principal Stress Direction and a Principal Stress Difference FIG. 7 shows a measuring device for measuring a principal stress direction and a principal stress difference. In the basic structure, a principal stress direction and a principal stress difference can be obtained by introducing a circular polarized light into the tempered glass 10 and measuring a polarized state of an elliptically polarized light which is formed by a strain of the tempered glass 10 and passing therethrough. Light emitted from a light source 41 is passed through a polirizer 42 to form a linearly polarized light. Then, the linearly polarized light is passed through a ¼ λ retardation plate 43 to form a circularly polarized light. An analyzer 45 is disposed behind the tempered glass 10.

The tempered glass 10 is placed perpendicularly to the incident light. The circularly polarized light incident into the tempered glass 10 transmits through the tempered glass 10 to be an elliptically polarized light which is depending on a stress-strain of the tempered glass 10. The thus obtained elliptically polarized light is introduced into the analyzer which is rotated. The light passing through the rotating analyzer 45 is introduced into a light detection element 46. By measuring an output of the light detecting element 46, a state of the elliptically polarized light can be detected.

A principal stress direction and a principal stress difference can be obtained as follows from a state of the obtained elliptically polarized light. When $\theta_1$ and $\theta_2$ represent principal stress directions and δ represents a phase difference corresponding to a principal stress difference expressed by the Formula (5) as shown hereafter, an output I (φ) of the light detection element is expressed by the following Formula (1):

$$I(\phi)=k\{1-\sin\delta\cdot\sin 2(\theta-\phi)\} \quad (1)$$

where k is a proportionality factor and φ is an angle of rotation of the analyzer. The ratio of the minimum value $I_{min}$ to the maximum value $I_{max}$ of an output on the analyzer represents an ellipticity R. R and δ are linked in the following Formula (2):

$$R=I_{min}/I_{max}=(1-\sin\delta)/(1+\sin\delta) \quad (2)$$

(where δ>0)

Accordingly, the phase difference δ and principal stress directions $\theta_1$, $\theta_2$ are expressed by the following Formulas (2)', (3) and (4):

$$\delta=\sin^{-1}\{(1-R)/(1+R)\} \quad (2)'$$

$$\theta_1=\phi+\pi/4\pm n\pi \quad (3)$$

$$\theta_2=\phi-\pi/4\pm n\pi \quad (4)$$

A principal stress difference Δσ is expressed by the following Formula (5).

$$\Delta\sigma = \lambda/(c\cdot t) \times \frac{\delta}{360} \quad (5)$$

where λ is the wavelength of the light emitted from a light source 41 (in this measuring device, λ=632.8 nm), c is the photoelasticity constant (c=2.63 nm/cm/kg/cm², and t is a thickness of the tempered glass 10).

Namely, the principal stress difference and the principal stress direction can be obtained by obtaining an ellipticity R of the elliptically polarized light and an angle of rotation φ of the analyzer (an angle of a long axis of an ellipse when the maximum and minimum output values are obtainable).

In the stress measuring device, a He—Ne laser is used for the light source 41 because laser beams can be throttled to a small point so that a slight change of the tempered glass such as uneven tempering can be detected. A Gram-Tompson prism having excellent polarizing characteristics was used for the polarizer 42. A glass plate 47 was disposed between the polarizer 42 and the ¼ λ retardation plate 43 to take the reference light. An interference filter 49 was disposed between the glass plate 47 and a reference light detector 48 so as to minimize the influence of outer light. The ¼ λ retardation plate 43 used was such one that was formed by polishing quartz to produce a phase difference of π/2 to a wavelength of 632.8 nm. The rotating analyzer 45 used was the same as the analyzer 42. For the light detecting element 46, a solar cell with an interfering filter at its front side was used so as to minimize the influence of outer light in the same manner as the reference light detector 48.

Thus, the reference points a, b in the present invention can be determined by measuring the principal stress differences and principal stress directions at a large number of points. Further, by determining the reference points a and b, $L_a$, $L_b$, $L_c$ and $L_d$ can be determined.

A preferred method for producing the tempered glass of the present invention will be described.

Figure 3:
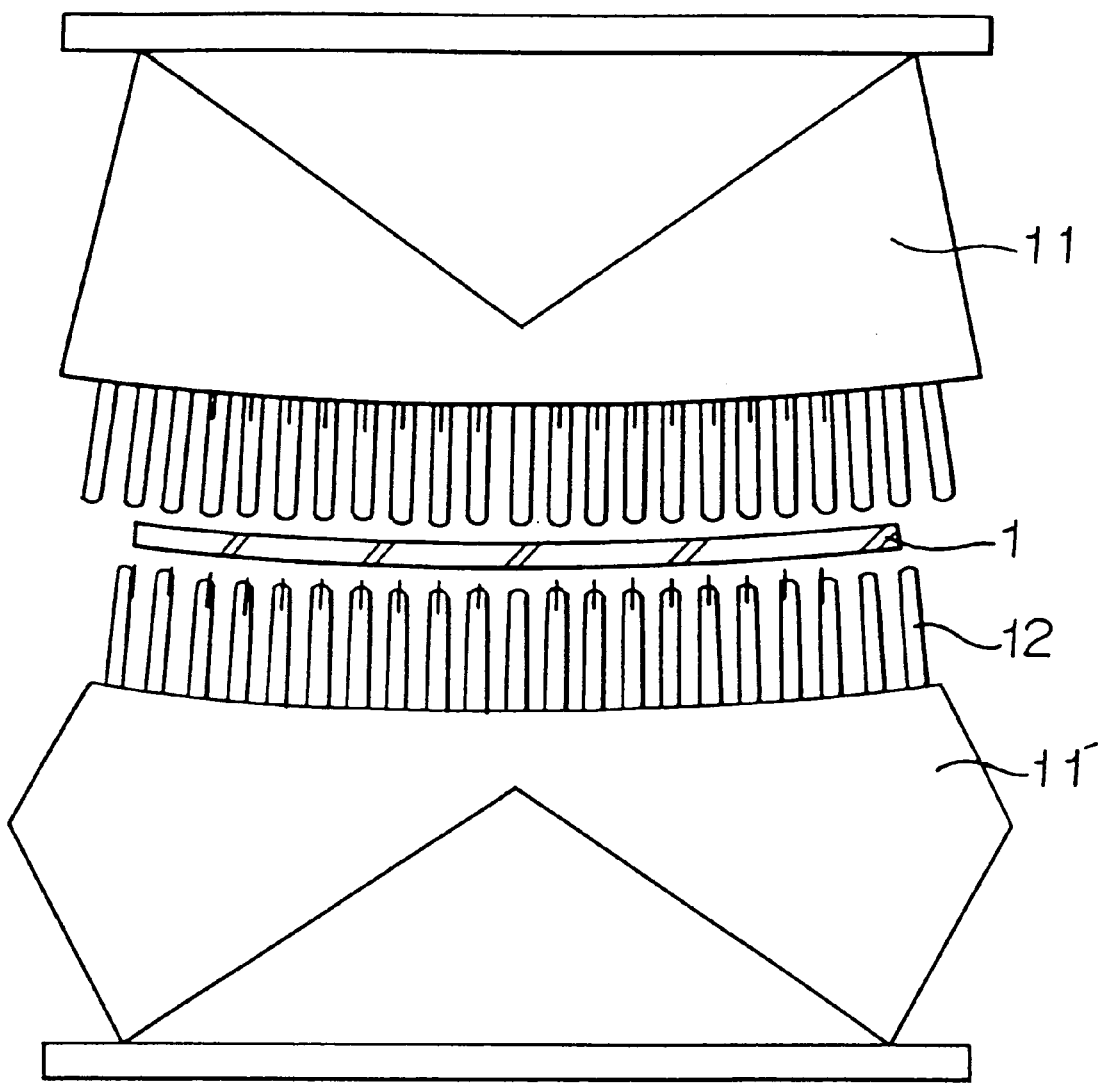
FIG. 3 is a vertically cross-sectional view showing an embodiment of the quenching apparatus for a glass sheet according to the present invention.

FIG. 3 is a diagram in cross section showing an embodiment of the quenching apparatus used for tempering a glass sheet according to the present invention. The quenching apparatus comprises mainly quenching boxes 11, 11' disposed so as to oppose each surface of a glass sheet 1 and a plurality of nozzles 10 attached to the quenching boxes 11, 11' at positions facing the glass sheet 1. Outer configurations defined by each group of the nozzles 12 attached to the quenching boxes 11, 11' substantially correspond to the shape of the glass sheet 1 respectively. The glass sheet 1 which has been heated to about a glass softening point in a heating furnace (not shown) and has been bent depending on requirement is transferred in a horizontal state between the quenching boxes 11, 11' by means of a suitable transferring means such as a ring or the like which is connected to a driving mechanism.

While the glass sheet is between the quenching boxes 11, 11', cooling air is blown at predetermined temperature and pressure to the glass sheet 1 through each of the nozzles whereby the glass sheet 1 is rapidly cooled to be desirably tempered.

Figure 4:
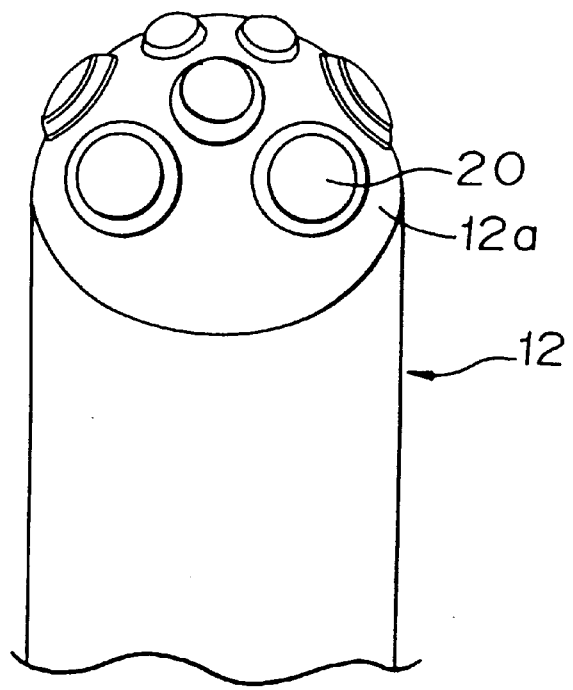
FIG. 4a is a perspective view showing an embodiment of a nozzle used for the quenching apparatus of the present invention.
FIG. 4b is a plan view from an upper part of the nozzle.
Figure 4:
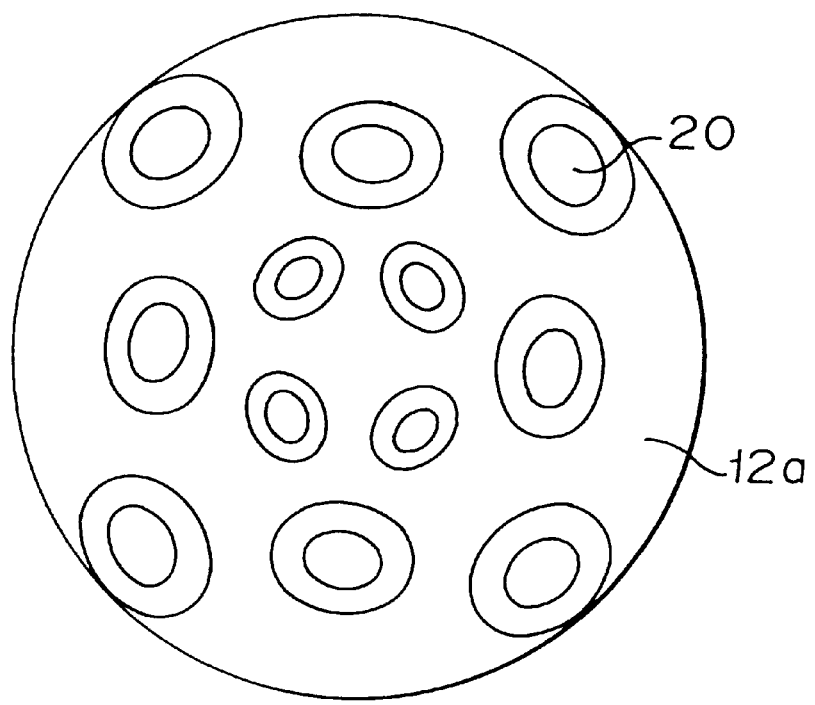

FIGS. 4a and 4b are respectively a perspective view and a plan view showing an embodiment of a nozzle attached to the quenching apparatus of the present invention. The nozzle is in a tubular form in which the end portion 12a facing the glass sheet 1 has a partially spherical shape which is protruded toward the glass sheet 1. Namely, the end portion has a convex, curved surface.

Figure 5:
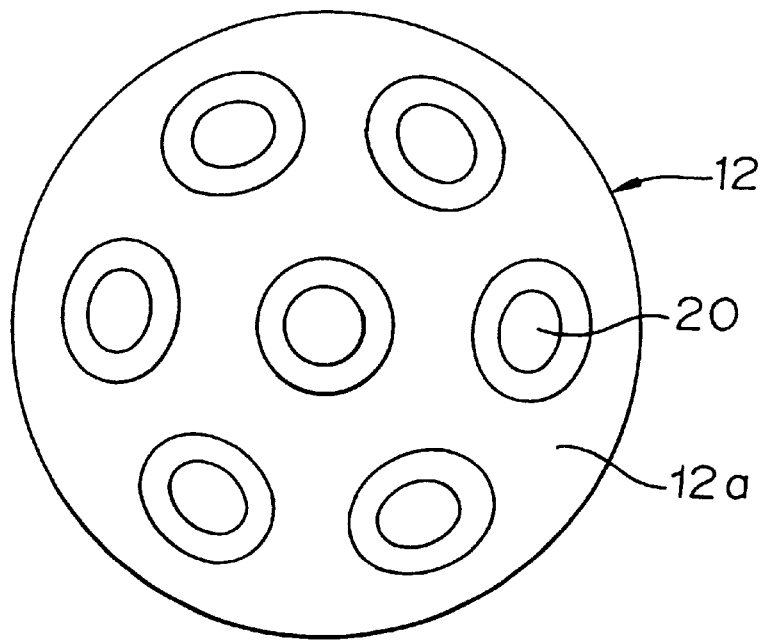
FIG. 5 is a plan view viewed from an upper part of another embodiment of the nozzle.

At the end portion 12a, a plurality of openings 20 are provided to supply cooling air toward the glass sheet 1. The openings 20 are uniformly provided in the convex, curved surface area of the end portion 12a in, for example, a pattern that they are distributed radially around the center line in the longitudinal direction of the nozzle. FIG. 5 is a plan view showing another embodiment of the arrangement of the nozzles according to the present invention.

Thus, use of the nozzle in which the end portion is in a convex, curved shape and has a plurality of openings, assures the way of escape of the cooling air after it has been blown to the glass sheet, and can increase the number of air streams per unit surface area on the glass sheet surface.

Figure 6:
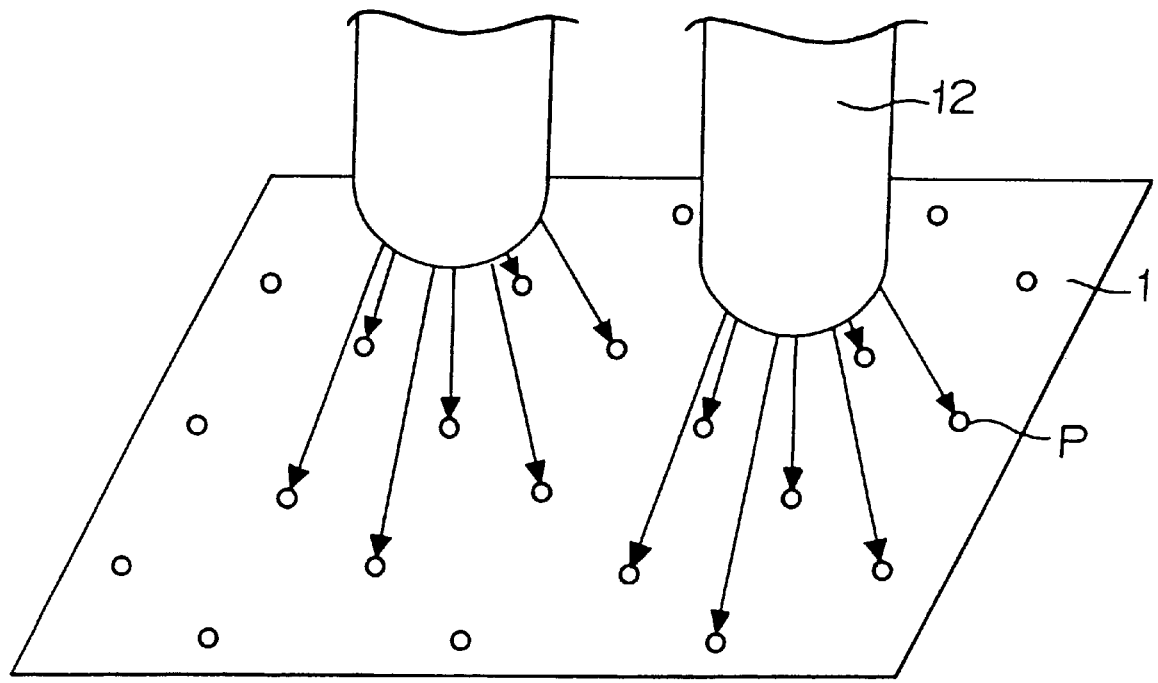
FIG. 6 is a diagram showing an example of a state of blowing cooling air in the present invention.

As shown in FIG. 6, cooling air is blown to the glass sheet 1 from each of the nozzles 12 so that points of intersection P of lines of blowing direction of air emitted from the nozzles 12 to the surface of the glass sheet 1 are arranged substantially uniform on the glass sheet 1. In this case, it is preferable that the number of points of intersection P is 30 or more per 10 cm square on the glass sheet 1. For this, a nozzle pitch, a distribution of openings formed in the nozzles and a distance between the free end of the nozzles and the glass sheet should properly be adjusted.

In the adjustment, it is preferable that an angle formed by a line of blowing direction and the surface of the glass sheet is 45° or less, and a distance between the free end of the nozzle and the surface of the glass sheet is about 4–6 times as large as the diameter of the opening, whereby fragments of glass as described in the official requirements can be obtained as well as providing a sufficient strength of glass sheet. Thus, a distribution of stress in a surface direction of the glass sheet can be made dense without reducing cooling efficiency (i.e., a distance between adjacent areas in which the principal stresses acting in the plan of the glass sheet are different is made short), and fragments at the breakage of the glass sheet can be small.

In particular, when a thin glass sheet was used and small fragments are desired to obtain, it was necessary to increase a cooling power of cooling air. In principle, even though a thin glass sheet having a thickness of about 2.3–3.5 mm is used, for instance, small fragments can be obtained at the breakage by increasing the cooling power of cooling air. However, when the cooling power is increased, the glass sheet may be broken at the initial stage of cooling because of a tensile stress which is temporarily produced in the glass sheet surface. Further, as described before, it is in fact difficult from a view of mechanical structure to increase intensively the cooling power. However, the present invention makes it possible to provide a glass sheet which can result small fragments at the breakage without intensively increasing the cooling power.

Further, when the glass sheet is of a complicated shape (such as a glass sheet which is bent to have a three-dimensionally complicated curved surface, in particular, it has a depth of 20 mm in an arched portion of a complicated curved surface), it is difficult to give a oscillation to the glass sheet so as to uniformly cool it. In the present invention, however, a stroke of oscillation to be given to the glass sheet between the quenching boxes can be short because the nozzles having the above-mentioned construction can allow a dense arrangement of the openings.

The construction of the quenching apparatus for a glass sheet according to the present invention is not limited to that as described above. For instance, the glass sheet may be held and transferred between the quenching boxes in a horizontal state or a vertical state. In connection with this, the quenching boxes may not be disposed in a vertically opposing relation as shown in the Figure, but may be arranged so as to meet a state of the glass sheet which is vertically held.

The shape of surface area formed by the group of the nozzles can be determined as desired depending on a shape of the glass sheet. However, to the glass sheet, it is preferable from the viewpoint of being applicable to the glass sheet with a predetermined stress that a distance between the free end of each of the nozzles to the glass sheet is substantially equal for all of the nozzles. Accordingly, the shape of surface area formed by the group of the nozzles should be substantially in agreement with a shape of the glass sheet. Further, the shape of a surface area formed by the group of the nozzles can be determined, irrespective of a shape of the glass sheet, by suitably controlling a temperature, an air quantity, a pressure and so on of cooling air from each of the nozzles, or suitably adjusting a nozzle pitch.

The quenching boxes may be connected to a blower or a compressor so that the cooling air is supplied from the blower or the compressor through the quenching boxes and each of the nozzles to the glass sheet. Or the quenching boxes may be divided into a plurality of blocks to which cooling air is supplied from the blower or the compressor.

The shape, the number and positions of the openings formed in each of the nozzles may be identical or not identical although these features are determined depending on a distribution of stress to be applied to the glass sheet.

The shape of the glass sheet is not in particular limited and it may be bend-shaped to have a predetermined radius of curvature or is in a flat form. For the purpose of the present invention, the quenching apparatus is in particular effective for cooling a glass sheet which is bend-shaped to have a complicated curved surface.

The temperature of cooling air which is just before being blown to the glass sheet is preferably at or near a glass softening point such as 620–700° C. This is because a glass sheet for automobile is usually heated to a temperature capable of bend-shaping, and a tempering treatment is conducted just after a bend-shaping step.

The glass sheet to which a tempering treatment is conducted to provide effectively a predetermined stress with use of quenching apparatus of the present invention, should have a thickness of 2.3–3.5 mm. In the conventional quenching apparatus, when a thin glass sheet was to be tempered, it was difficult to obtain a tempered glass which was fractured into small fragments at the breakage unless the cooling power was increased. On the other hand, in the quenching apparatus of the present invention, a tempered glass capable of fracturing into small fragments at the breakage can be provided without increasing the cooling power.

For the tempered glass of the present invention, a glass sheet to which the quenching method or the quenching apparatus of the present invention is used, preferably has the dimensions of about (800–1500)×(500–1000)mm. Further, a depth in an arched portion formed in the glass sheet is preferably in a range of 10–30 mm.

Now, the present invention will be described in detail with reference to examples. However, it should be understood that the present invention is by no means restricted by such specific examples.

Glass sheets having dimensions as shown in Table 1 were tempered under the cooling conditions shown in Table 1 to prepare several kinds of tempered glass of Examples 1–10. Further, a simulation of tempering treatment was conducted to the glass sheets having dimensions shown in Table 1 under the cooling conditions in Table 1 to prepare models of tempered glass of Examples 11–14. In Examples 1–5, the tempering treatment was conducted by using the apparatus shown in FIGS. 3 and 4. In Examples 6–10, the tempering treatment was conducted by using an apparatus having conventional nozzles (arranged with a large nozzle pitch).

Figure 8:
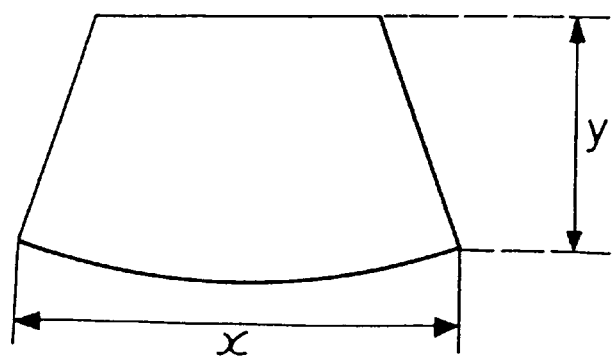
FIGS. 8a and 8b are respectively a front view and a cross-sectional view for explaining dimensions of the glass sheet.
Figure 8:
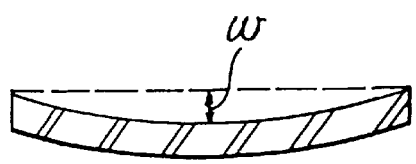

In Table 1, "depth" (W) means a depth (unit: mm) of a bent portion (an arched portion) in a short side direction of the glass sheet; "temperature" means a temperature (unit: ° C.) of the glass sheets at the time of initiating cooling; and "distance" means a distance (unit:mm) from the free end of the nozzles to the glass sheet surface. In addition, mm is used for the unit of a thickness (t) and dimensions (x×y) of the glass sheets, and mmAq is used for the unit of window pressure of cooling air. In determining the dimensions, FIG. 8 is referred to. The depth W is determined to have the greatest value in FIG. 8.

The thus obtained tempered glass indicated physical values shown in Table 2. The maximum surface compressive stress $\sigma_{max}$, the minimum surface compressive stress $\sigma_{min}$, the principal stress differences $\sigma_a$, $\sigma_b$ and the distances $L_a$, $L_b$, $L_c$ and $L_d$ in Table 2 were obtained by the measurement of the above-mentioned measurements: (A) the measurement of the surface compressive stress and (B) the measurement of the principal stress direction and the principal stress difference. The unit for $L_a$, $L_b$, $L_c$ and $L_d$ is mm and the unit for $\sigma_{max}$, $\sigma_{min}$, $\sigma_a$ and $\sigma_b$ is kg/cm².

The glass sheets to which the tempering treatment was conducted were subjected to tests similar to the fragmentation tests for tempered glass described in JIS R3212 to obtain a result shown in Table 3 (wherein "—" means unmeasured). Further, in Table 3, "impact point" means an impact point to a sample having a complicated curved surface in the test of according to JIS R3206; "$N_{min}$" (the minimum number) indicates the number of fragments in the area having the smallest number of fragments among areas of 50×50 mm square which are positioned around the impact point and are 75 mm apart from the impact point (JIS R3211, Table 5 which concerns the behavior of fragments of tempered glass as a safety glass for automobile); "$N_{max}$" (the maximum number) indicates the number of fragments in the area having the largest number of fragments in areas of 50×50 mm square which are positioned around the impact point and are 75 mm apart from the impact point in the above-mentioned behavior of fragments; and "number of elongated fragments" indicates the number of elongated fragments having a length ranging from 75 mm to 150 mm; and "surface area of large fragments" indicates the surface area of the largest fragment (unit: cm$^2$).

TABLE 1

| Example | Thickness | Dimension (x × y) | Depth (w) | Wind pressure | Temperature | Distance |
|---|---|---|---|---|---|---|
| 1 | 2.5 | 1300 × 800 | 18 | 2400 | 650 | 10 |
| 2 | 2.8 | 1300 × 800 | 18 | 2000 | 650 | 10 |
| 3 | 3.2 | 1300 × 800 | 18 | 1400 | 650 | 10 |
| 4 | 2.65 | 1300 × 800 | 20 | 2100 | 650 | 10 |
| 5 | 2.65 | 1300 × 800 | 19.5 | 2100 | 650 | 10 |
| 6 | 3.2 | 1300 × 800 | 18 | 2300 | 650 | 50 |
| 7 | 2.5 | 1300 × 550 | 20 | 2300 | 650 | 50 |
| 8 | 2.8 | 1300 × 550 | 20 | 2200 | 650 | 45 |
| 9 | 2.5 | 1200 × 450 | 18 | 1600 | 650 | 45 |
| 10 | 2.8 | 1200 × 450 | 18 | 1600 | 650 | 45 |
| 11 | 2.5 | 1300 × 800 | 18 | 2000 | 650 | 10 |
| 12 | 2.5 | 1300 × 800 | 18 | 2400 | 650 | 10 |
| 13 | 2.5 | 1300 × 800 | 18 | 2400 | 650 | 10 |
| 14 | 2.5 | 1300 × 800 | 18 | 2400 | 650 | 10 |

TABLE 2

| Example | $\sigma_{min}$ | $\sigma_{max}$ | $\sigma_a$ | $\sigma_b$ | $L_a$ | $L_a$ | $L_c$ | $L_d$ |
|---|---|---|---|---|---|---|---|---|
| 1 | 1000 | 1200 | 60 | 60 | 20 | 30 | 30 | 20 |
| 2 | 1000 | 1250 | 60 | 60 | 20 | 30 | 30 | 20 |
| 3 | 1000 | 1300 | 60 | 60 | 20 | 30 | 30 | 20 |
| 4 | 1000 | 1250 | 65 | 65 | 20 | 30 | 30 | 20 |
| 5 | 1000 | 1250 | 65 | 65 | 20 | 30 | 30 | 20 |
| 6 | — | — | — | — | — | — | — | — |
| 7 | — | — | — | — | — | — | — | — |
| 8 | — | — | — | — | — | — | — | — |
| 9 | — | — | — | — | — | — | — | — |
| 10 | — | — | — | — | — | — | — | — |
| 11 | 1000 | 1200 | 60 | 60 | 40 | 10 | 30 | 20 |
| 12 | 1000 | 1200 | 60 | 60 | 10 | 40 | 30 | 20 |
| 13 | 1000 | 1200 | 60 | 60 | 10 | 30 | 20 | 30 |
| 14 | 1000 | 1200 | 60 | 30 | 10 | 30 | 30 | 20 |

TABLE 3

| Example | Impact point | $N_{min}$ | $N_{max}$ | Number of elongated fragments | Surface area of large fragments |
|---|---|---|---|---|---|
| 1 | 1 | 102 | 352 | 0 | — |
|   | 2 | 158 | 308 | 0 | — |
|   | 3 | 74 | 395 | 0 | — |
|   | 4 | 99 | 277 | 0 | 2.6 |
| 2 | 1 | 220 | 330 | 0 | — |
|   | 2 | 205 | 376 | 0 | — |
|   | 3 | 172 | 281 | 0 | — |
|   | 4 | 177 | 374 | 0 | — |
| 3 | 3 | 130 | — | 0 | — |
| 4 | 3 | 75 | 275 | 0 | 2.6 |
| 5 | 3 | 71 | 296 | 0 | 2.1 |
| 6 | 3 | 100 | — | — | — |
| 7 | 3 | 1 | — | — | — |
| 8 | 3 | 54 | — | — | — |
| 9 | 3 | 10 | — | — | — |
| 10 | 3 | 34 | — | — | — |
| 11 | 3 | — | — | 1 | — |
| 12 | 3 | — | — | 0 | 3.1 |
| 13 | 3 | — | — | 0 | 3.2 |
| 14 | 3 | — | — | 0 | 4.1 |

In comparison of Example 3 with Example 6, it is found that in order to obtain the tempered glass satisfying the requirements of the safety glass for automobile, the supply of cooling air under a window pressure of 1400 mmAq is sufficient in Example 3 (the Example using the method and apparatus of the present invention), whereas the cooling air of a window pressure of 2300 mmAq is needed in Example 6 (the Example using the conventional nozzles).

Further, in Examples 6–10, the minimum numbers are small in comparison with Examples 1–5. From the fact, it is found that in the conventional apparatus, it is difficult to arrange the nozzles to be dense in order to assure the way of escape of cooling air and it is difficult to obtain small fragments.

In comparison of Example 1 with Example 11, it is found that when $\sigma_a$ is small with respect to $L_a$ (when $L_a$ is imbalancedly larger than $\sigma_a$), the development of cracks in the belt-like regions A can not be prevented whereby small fragments are produced. In comparison of Example 1 with Example 12, it is found that when $L_b$ is imbalancedly larger than $L_c$ or $L_d$, the crossing of cracks in the belt-like regions B can be obtained whereby large fragments are produced. In comparison of Example 1 with Example 13, it is found that when $L_c<L_d$, large fragments are produced unless $L_a$ is made small. In comparison of Example 1 with Example 14, it is found that an excessively small $\sigma_b$ produces large fragments.

In the tempered glass meeting the principal stress characteristics (1) and (2), and preferably, further meeting the principal stress characteristics (3)–(6) as described above, the development of cracks can be controlled so that the fragmentation satisfying the official requirements can be obtained. Even by using a thin glass sheet, a tempered glass meeting the requirements can be obtained.

Further, the present invention is to provide nozzles each having a plurality of openings at its free end portion which has a convex, curved shape so that cooling air supplied from quenching boxes is blown to a glass sheet. The nozzles of the present invention is applicable to a thin glass sheet to which a sufficient strength could not be provided by the conventional tempering method and apparatus, and the present invention can provide an excellent effect to produce a tempered glass having a sufficient strength which satisfies requirement of safety of a window glass for automobile.

In accordance with the present invention, it is obtainable an excellent effect to realize a sufficient strength in a tempered glass with a small quantity of air in comparison with the conventional tempering method and apparatus which were applied to a thicker glass sheet.

What is claimed is:

1. In a quenching method for tempering a glass sheet comprising transferring a heated glass sheet between a pair of quenching boxes each provided with a plurality of nozzles which are opposingly arranged near both surfaces of the glass sheet and which blow to the glass surfaces cooling air supplied from the quenching boxes, the quenching method being characterized in that nozzles arranged facing at least a side of the glass surfaces are provided with a plurality of openings capable of blowing the cooling air in different directions simultaneously wherein the cooling air is blown to the glass surface so that intersections of blowing directions of air streams of cooling air through the nozzles to the glass surface are arranged substantially uniform on the glass surface.

2. The quenching method according to claim 1, wherein the number of the intersections on the glass surface are 30 or more in any 10 cm square.

3. In a quenching method for tempering a glass sheet comprising transferring a heated glass sheet between a pair of quenching boxes each provided with a plurality of nozzles which are opposingly arranged near both surfaces of the glass sheet and which blow to the glass surfaces cooling air supplied from the quenching boxes, the quenching method being characterized in that a plurality of nozzles in a tubular form are arranged at at least a side of the glass surfaces wherein each end portion of the nozzles opposing the glass sheet has a convex, curved shape, and a plurality of openings are formed in the end portion so that cooling air supplied from the quenching boxes is blown to the glass sheet through the nozzles.

4. In a quenching apparatus for a glass sheet comprising at least quenching boxes arranged opposing to both surfaces of the glass sheet and a plurality of nozzles attached to the quenching boxes so that cooling air is blown through the nozzles to the glass sheet heated to a predetermined temperature, the quenching apparatus being characterized in that each of the nozzles is in a tubular form and has an end portion in a convex, curved shape at a side opposing the glass sheet, and a plurality of openings are formed in the end portion so that cooling air supplied from the quenching boxes is blown to the glass sheet.

5. The quenching apparatus according to claim 4, wherein the plurality of openings formed in the end portion of the nozzles are uniformly arranged.

\* \* \* \* \*